US010585165B2

(12) United States Patent
Takahashi

(10) Patent No.: US 10,585,165 B2
(45) Date of Patent: Mar. 10, 2020

(54) NAVIGATION SATELLITE SYSTEM, ELECTRONIC DEVICE, TRANSMITTER, AND POSITIONING METHOD

(71) Applicant: Panasonic Intellectual Property Management Co., Ltd., Osaka (JP)

(72) Inventor: Katsunao Takahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 204 days.

(21) Appl. No.: 15/712,664

(22) Filed: Sep. 22, 2017

(65) Prior Publication Data

US 2018/0011165 A1 Jan. 11, 2018

Related U.S. Application Data

(63) Continuation of application No. PCT/JP2016/000972, filed on Feb. 24, 2016.

(30) Foreign Application Priority Data

Mar. 27, 2015 (JP) .................................. 2015-067428

(51) Int. Cl.
*H04W 4/02* (2018.01)
*G01S 5/14* (2006.01)
*G01S 19/43* (2010.01)

(52) U.S. Cl.
CPC ................ *G01S 5/14* (2013.01); *G01S 19/43* (2013.01)

(58) Field of Classification Search
CPC ....... G01S 5/14; G01S 19/43; G08B 13/1427; G08B 13/1436; H04W 4/02; H04W 4/021;
(Continued)

(56) References Cited

U.S. PATENT DOCUMENTS 6,272,312 B1 * 8/2001 Takayama .............. H03D 3/007
455/3.02
7,633,387 B2 * 12/2009 Carmichael ............ A62C 99/00
340/519
(Continued)

FOREIGN PATENT DOCUMENTS

JP 10-213644 A 8/1998
JP 2007-316028 A 12/2007

OTHER PUBLICATIONS

International Search Report for corresponding International Application No. PCT/JP2016/000972 dated May 24, 2016.

*Primary Examiner* — Richard A Goldman
(74) *Attorney, Agent, or Firm* — Renner, Otto, Boisselle & Sklar, LLP

(57) ABSTRACT

A navigation satellite system includes a transmitter that transmits a first radio wave having a predetermined frequency, and an electronic device that calculates position coordinates of the electronic device by using a second radio wave from a GNSS satellite, and obtains position coordinates of the transmitter. The electronic device includes a receiver that receives the first radio wave from the transmitter and the second radio wave from the GNSS satellite, and a controller that calculates a distance between the electronic device and the transmitter based on the received first radio wave, and calculates position coordinates of the electronic device based on the received second radio wave. The controller calculates, based on second radio wave received when the electronic device is present at each one of three or more points, respective position coordinates of the three or more points, and calculates respective distances between the electronic device and the transmitter when the electronic device is present at each one of the three or more points. The controller calculates the position coordinates of the transmitter based on the position coordinates of the three
(Continued)

or more points and respective distances between each one of the three or more points and the transmitter.

16 Claims, 7 Drawing Sheets

(58) Field of Classification Search
CPC ..... H04W 4/023; H04W 4/025; H04W 4/029; H04W 12/00503; H01Q 1/32; H01Q 1/3241; H01Q 1/3233
USPC ............ 701/408, 468, 470; 340/539.13
See application file for complete search history.

(56) References Cited

U.S. PATENT DOCUMENTS

| | | | | |
|---|---|---|---|---|
| 8,363,768 B2* | 1/2013 | Patino-Studencka | | G01S 5/0221 |
| | | | | 375/354 |
| 9,357,348 B2* | 5/2016 | Evans | | H04W 4/023 |
| 9,654,916 B2* | 5/2017 | de la Broise | | H04W 12/06 |
| 9,947,210 B2* | 4/2018 | de Barros Chapiewski | | H04W 4/029 |
| 10,008,097 B1* | 6/2018 | Kumar | | G08B 21/24 |
| 10,082,554 B1* | 9/2018 | de la Broise | | G01S 19/34 |
| 2003/0064699 A1* | 4/2003 | Olsen | | H03D 7/16 |
| | | | | 455/318 |
| 2004/0108963 A1* | 6/2004 | Clymer | | H01Q 1/32 |
| | | | | 343/837 |
| 2008/0129591 A1* | 6/2008 | Lamance | | G01S 19/05 |
| | | | | 342/357.42 |
| 2011/0171986 A1* | 7/2011 | Levin | | H04B 7/0837 |
| | | | | 455/509 |
| 2014/0153632 A1* | 6/2014 | Malaga | | H04L 25/4902 |
| | | | | 375/239 |
| 2014/0176364 A1* | 6/2014 | Brauner | | H04J 3/02 |
| | | | | 342/357.76 |
| 2015/0093995 A1* | 4/2015 | Gilbert | | H04W 24/08 |
| | | | | 455/63.1 |
| 2015/0357707 A1* | 12/2015 | Tsutsumi | | H01Q 3/12 |
| | | | | 343/763 |
| 2017/0069972 A1* | 3/2017 | Miller | | H01Q 13/06 |
| 2017/0141820 A1* | 5/2017 | Kim | | H04B 1/40 |

* cited by examiner

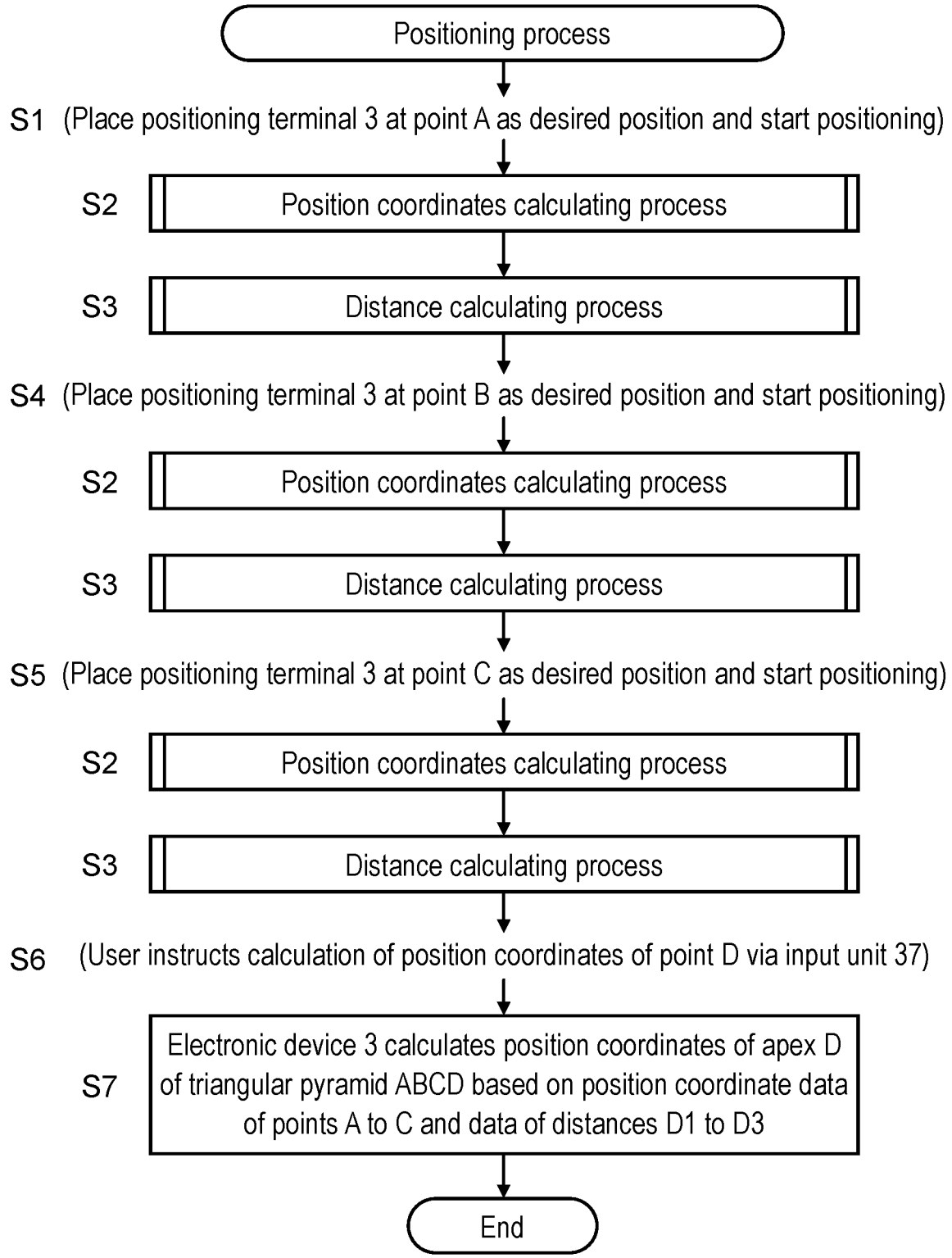

NAVIGATION SATELLITE SYSTEM, ELECTRONIC DEVICE, TRANSMITTER, AND POSITIONING METHOD

BACKGROUND

1. Technical Field

The present disclosure relates to a navigation satellite system, an electronic device, a transmitter, and positioning method that receive a radio wave from a global navigation satellite system (GNSS) satellite such as a global positioning system (GPS) satellite and calculate position coordinates.

2. Description of the Related Art

A GPS is a navigation satellite method for performing three-dimensional detection on the earth based on positions of twenty-four satellites that rotate above the earth. One example of the GPS is a kinematic positioning method. The kinematic positioning method is a method for calculating an error based on a radio wave (a carrier wave) received by a fixed station (a base station) whose position coordinates have been known (an electronic reference point), and transmitting the calculated error to a mobile station (an electronic device) to improve accuracy of navigation in the mobile station. A developed positioning method of the kinematic positioning method is a real time kinematic positioning method for navigating a mobile station in real time (hereinafter, referred to as an RTK positioning method). In the RTK positioning method, position coordinates are obtained by using a difference in a wave number (a number of waves) of carrier waves (radio waves) transmitted from the GPS satellite to the earth. However, in order to perform the RTK positioning method, a radio wave from a GPS satellite should be received in a mobile station whose position coordinates are to be obtained. Therefore, the RTK positioning method cannot be performed in a place such as under a bridge, where a radio wave cannot be received from the GPS satellite.

Unexamined Japanese Patent Publication No. 10-213644 (1998) discloses a man location system that estimates a current position through three-point survey calculation among base station estimated positions of personal handyphone system (PHS) base stations and a pseudo distance due to electric field strength when a radio wave from a GPS satellite cannot be received.

SUMMARY

The present disclosure provides a navigation satellite system, an electronic device, a transmitter, and a transmitter, and a positioning method that enable accurate positioning.

A navigation satellite system of the present disclosure includes a transmitter that transmits a first radio wave having a predetermined frequency, and an electronic device that calculates position coordinates of the electronic device by using a second radio wave from a GNSS satellite. The navigation satellite system obtains position coordinates of the transmitter. The electronic device includes a receiver and a controller. The receiver receives a first radio wave from the transmitter, and a second radio wave from the GNSS satellite. The controller calculates a distance between the electronic device and the transmitter based on the received first radio wave, and calculates position coordinates of the electronic device based on the received second radio wave. The controller calculates respective position coordinates of three or more points based on a second radio wave received when the electronic device is present at each one of the three or more points. The controller then calculates respective distances between the electronic device and the transmitter when the electronic device is present at each one of the three or more points, and calculates position coordinates of the transmitter based on the position coordinates of the three or more points and distances between each one of the three or more points and the transmitter.

The positioning method for a navigation satellite system of the present disclosure is a positioning method for calculating position coordinates of a desired position by using a transmitter that transmits a first radio wave having a predetermined frequency, and an electronic device that calculates position coordinates of the electronic device by using a second radio wave from a GNSS satellite. The positioning method includes a step of, when the electronic device is preset at three or more points, causing the transmitter to transmit the first radio wave on the desired position. Further, the positioning method includes a step of causing the electronic device to receive, when electronic device is present at each one of the three or more points, the first radio wave from the transmitter, and the second radio wave from the GNSS satellite. The positioning method includes a step of calculating, based on the second radio wave received when the electronic device is present at each one of the three or more points, position coordinates of the three or more points. The positioning method includes a step of calculating, based on the first radio wave received when the electronic device is present at each one of the three or more points, respective distances between the electronic device and the transmitter. Further, the positioning method includes a step of calculating the position coordinates of the desired position based on the position coordinates and respective distances between the electronic devices and the transmitter when the electronic device is present at each one of the three or more points.

An electronic device of the present disclosure calculates position coordinates of the electronic device by using a radio wave from a GNSS satellite. The electronic device includes a receiver and a controller. The receiver receives a first radio wave from the transmitter on a desired position, and a second radio wave from the GNSS satellite. The controller calculates a distance between the electronic device and the transmitter based on the received first radio wave, and calculates position coordinates of the electronic device based on the received second radio wave. The controller calculates respective position coordinates of a plurality of points based on a second radio wave received when the electronic device is present at each one of the plurality of points. The controller then calculates respective distances between the electronic device and the transmitter when the electronic device is present at each one of the plurality of points, and calculates position coordinates of the transmitter based on the position coordinates of three or more points and respective distances between each one of the three or more points and the transmitter.

In a transmitter for a navigation satellite system of the present disclosure, the navigation satellite system includes a transmitter that transmits a first radio wave having a predetermined frequency, and an electronic device that calculates position coordinates of the electronic device by using a second radio wave from a GNSS satellite. The navigation satellite system obtains position coordinates of the transmitter. The transmitter transmits a radio wave having a frequency of 1575.42 MHz or 1227.60 MHz.

BRIEF DESCRIPTION OF THE DRAWINGS

FIG. 6A is a flowchart of a positioning process in the positioning terminal according to the exemplary embodiment;

DETAILED DESCRIPTION

Exemplary embodiments will be described herein in detail with reference to the drawings appropriately. However, detailed description more than necessary might be sometimes omitted. For example, there are cases where redundant explanations with respect to detailed descriptions of well-known matters and substantially the same configuration are omitted. These omissions are made to avoid unnecessary redundancy of the following description, and to facilitate the understanding by those skilled in the art.

Note that the inventor of the present disclosure provides the accompanying drawings and the following description in order to allow those skilled in the art to fully understand the present disclosure, and do not intend to limit the subject matter as described in the appended claims In the following exemplary embodiment, as an example of a global navigation satellite system (GNSS), a global positioning system (GPS) will be described. Examples of the GNSS include GLONASS, BeiDou, and Galileo besides the GPS. A technique of the present disclosure can be applied also to these GNSSs.

Outline of the Present Disclosure

In an RTK positioning method, in order to obtain position coordinates of an unknown point (a point whose position is unclear), GPS correction data is received from a fixed station having known position coordinates, and the position coordinates are obtained based on the received GPS correction data. The GPS correction data is used for calculating an error obtained by performing subtraction between position coordinates obtained by receiving a radio wave from the GPS satellite and accurate position coordinates at a point having clear position coordinates (a fixed station or a base station). Use of this GPS correction data enables accurate positioning.

However, in order to perform the RTK positioning method, a radio wave from the GPS satellite should be received. However, a radio wave from the GPS satellite cannot be occasionally received in an urban canyon or a construction site such as a place under a bride beam, and in this case, positioning cannot be performed.

An attention is paid to the above-mentioned problem, and the present disclosure provides a navigation satellite system, an electronic device, a transmitter, and a positioning method that can obtain, by using position coordinate data at a known point where a radio wave can be received from the GNSS satellite such as a GPS satellite (positioning using a radio wave from the GNSS satellite is available for the known point), position coordinates at an unknown point where a radio wave from the GNSS satellite cannot be received (positioning using a radio wave from the GNSS satellite is not available for the unknown point). An exemplary embodiment will now be described herein with reference to FIGS. 1 to 6.

Exemplary Embodiment

1. Configuration

Figure 1:
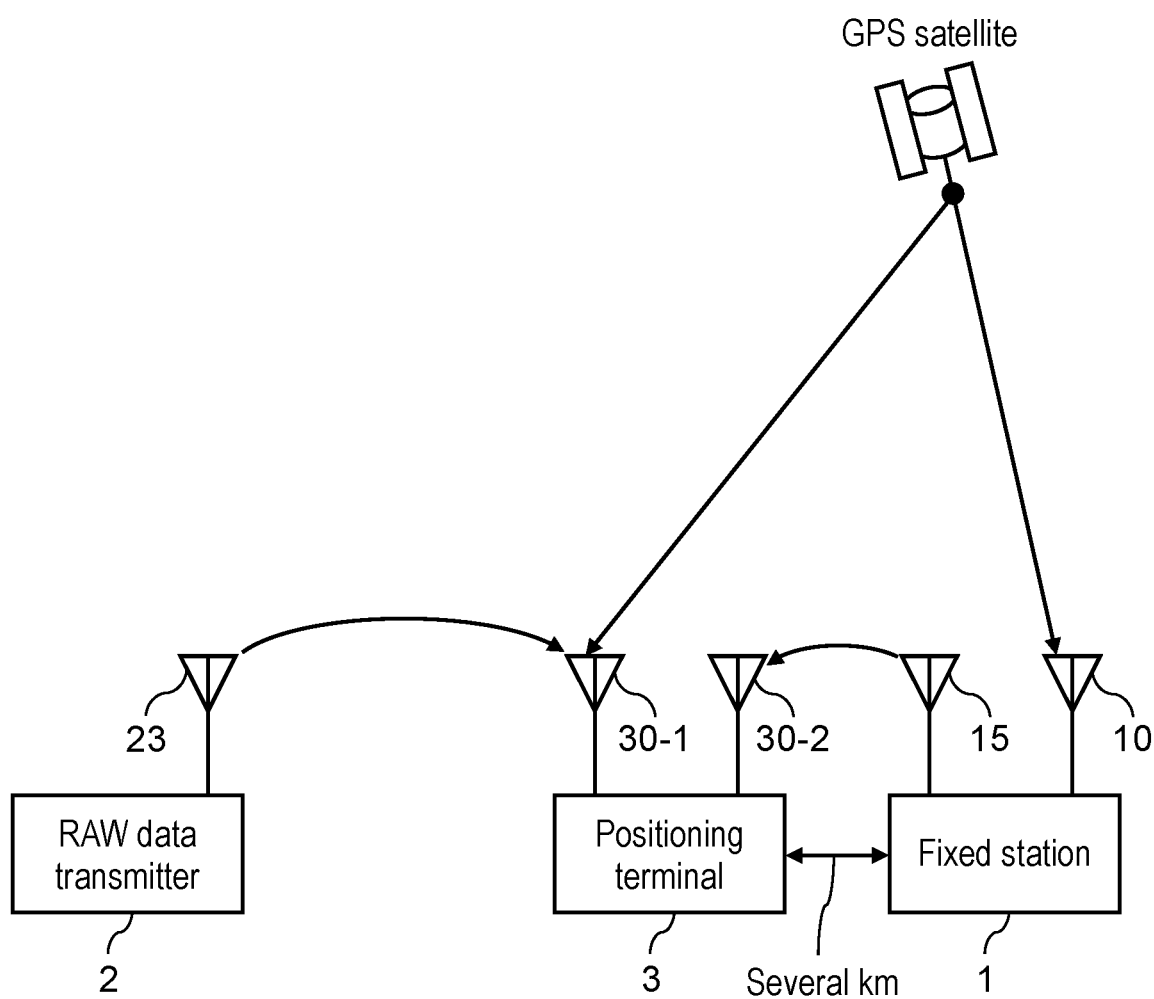
FIG. 1 is a schematic diagram illustrating a navigation satellite system according to an exemplary embodiment.

FIG. 1 is a schematic diagram illustrating a navigation satellite system according to an exemplary embodiment. The navigation satellite system in FIG. 1 includes fixed station 1, raw data transmitter 2, and positioning terminal 3. Positioning terminal 3 is an electronic device such as a personal computer. Fixed station 1 is installed on an electronic reference point having known coordinates, and positioning terminal 3 moves away from fixed station 1.

Fixed station 1 and positioning terminal 3 receive radio waves from the GPS satellite as carrier waves via GPS receiving antennas 10, 30-1, respectively. Positioning terminal 3 calculates, for each GPS satellite, a path difference between a carrier wave observed in positioning terminal 3 and a carrier wave received by fixed station 1, and obtains a baseline vector whose start point is fixed station 1 to obtain position coordinates of positioning terminal 3. Positioning terminal 3 receives GPS correction data from fixed station 1 via radio transmitting antenna 15 and radio receiving antenna 30-2, and performs the RTK positioning method based on the received GPS correction data and the carrier wave observed in positioning terminal 3 to calculate the position coordinates of positioning terminal 3. Further, raw data transmitter 2 generates a radio wave having a frequency identical to a frequency of the radio wave from the GPS satellite, and transmits the generated radio wave to positioning terminal 3 via radio transmitting antenna 23 and GPS receiving antenna 30-1. Details of the above process will be described below.

Figure 2:
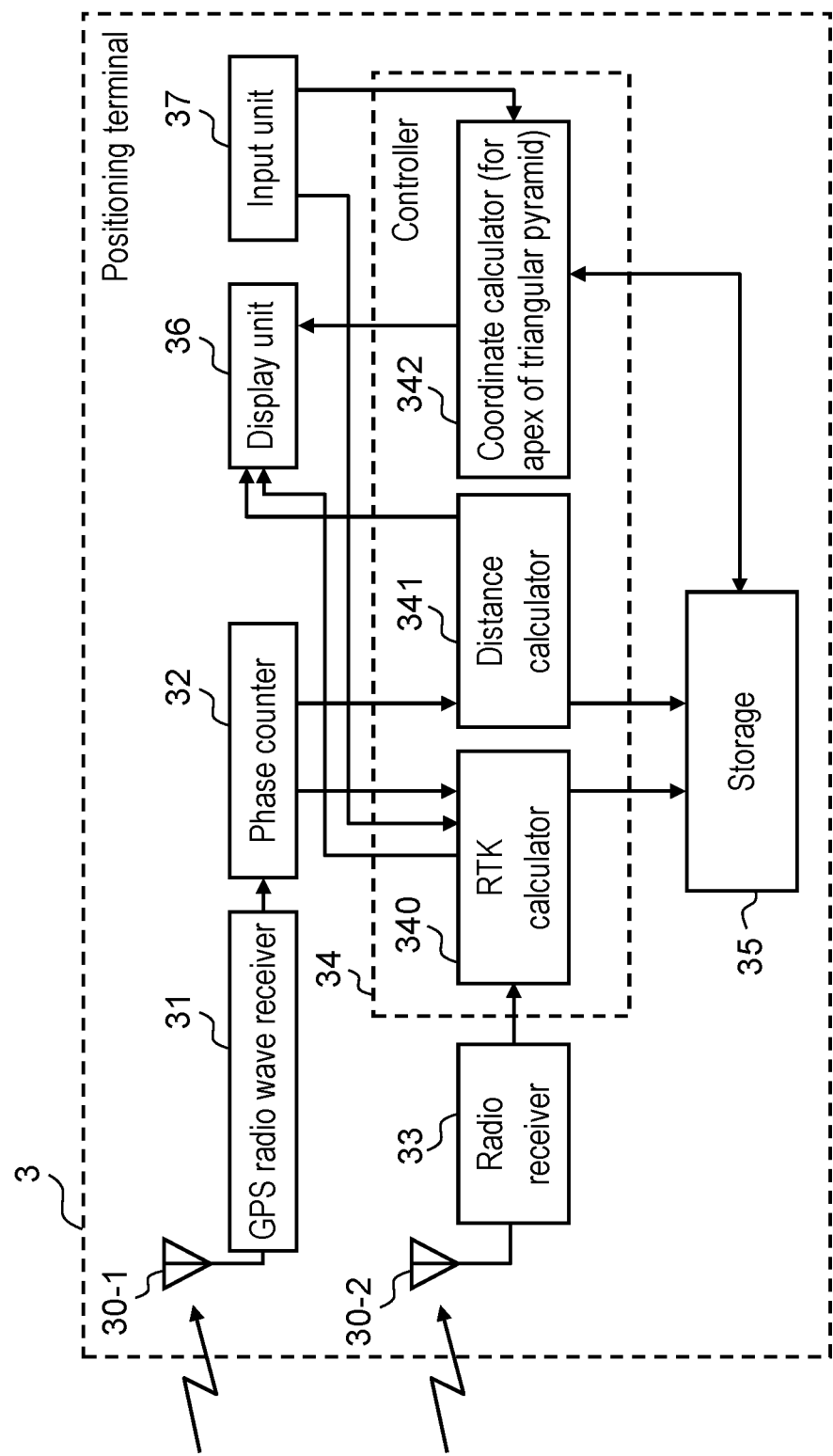
FIG. 2 is a block diagram illustrating a configuration of a positioning terminal in FIG. 1.

FIG. 2 is a block diagram illustrating a configuration of positioning terminal 3. Positioning terminal 3 includes GPS receiving antenna 30-1, radio receiving antenna 30-2, GPS radio wave receiver 31, phase counter 32, radio receiver 33, controller 34, storage 35, display unit 36, and input unit 37. Display unit 36 is, for example, a liquid crystal display. Input unit 37 is an input user interface (UI) such as a keyboard or a mouse. Further, controller 34 includes RTK calculator 340, distance calculator 341, and coordinate calculator 342. Controller 34 is configured with a central processing unit (CPU) or a microprocessor unit (MPU), and executes a predetermined program to execute a predetermined function. Alternatively, controller 34 may be configured with a dedicated hardware circuit (for example, a field-programmable gate array (FPGA) or an application-specific integrated circuit (ASIC)). When positioning of positioning terminal 3 is started, a user operates positioning terminal 3 via input unit 37.

GPS radio wave receiver 31 receives a radio wave as a carrier wave from the GPS satellite via GPS receiving antenna 30-1, and outputs received carrier wave data to phase counter 32. Further, GPS radio wave receiver 31 receives a radio wave as a carrier wave from raw data transmitter 2 via GPS receiving antenna 30-1, and outputs received carrier wave data to phase counter 32.

Phase counter 32 counts a wave number of the carrier wave based on the carrier wave data of the radio wave received by positioning terminal 3, and calculates a carrier phase to output the carrier phase to RTK calculator 340. Phase counter 32 counts a wave number of the carrier wave based on the carrier wave data of the radio wave from raw data transmitter 2, and calculates and outputs a carrier phase to distance calculator 341.

Radio receiver 33 receives GPS correction data from fixed station 1 via radio receiving antenna 30-2. Radio receiver 33 outputs the received GPS correction data to RTK calculator 340.

When the user performs an operation for starting positioning, input unit 37 generates a positioning start instructing signal to output the positioning start instructing signal to RTK calculator 340.

RTK calculator 340 calculates, based on the input positioning start instructing signal, a path difference that is a difference between the carrier phase of the radio wave received by fixed station 1 and the carrier phase of the radio wave received by positioning terminal 3. RTK calculator 340 obtains, based on the calculated path difference, a baseline vector whose start point is fixed station 1 and whose end point is positioning terminal 3, and calculates position coordinates of positioning terminal 3 (relative coordinates of positioning terminal 3 with respect to fixed station 1). RTK calculator 340 then outputs calculated position coordinate data to display unit 36 to store the position coordinate data in storage 35. Display unit 36 displays the calculated position coordinates of positioning terminal 3.

Distance calculator 341 calculates, based on the carrier phase of the radio wave from raw data transmitter 2 sent from phase counter 32, a distance between positioning terminal 3 and raw data transmitter 2, and outputs data of the calculated distance to display unit 36 to store the data in storage 35. Distance calculator 341 multiplies a length of one wavelength by the carrier phase of the radio wave from raw data transmitter 2 to calculate the distance between positioning terminal 3 and raw data transmitter 2. Display unit 36 displays the distance data.

When the user instructs calculation of coordinates (an apex of a triangular pyramid), input unit 37 generates a coordinate calculation instructing signal to output the signal to coordinate calculator 342. The user checks, via display unit 36, that all pieces of data necessary for calculating the coordinates (of the apex of the triangular pyramid) are prepared.

Coordinate calculator 342 calculates and outputs position coordinates of an unknown point to display unit 36 based on the input coordinate calculation instructing signal, and position coordinates of a known point and a distance between the known point and the unknown point stored in storage 35. Display unit 36 displays the position coordinates of the unknown point.

Figure 3:
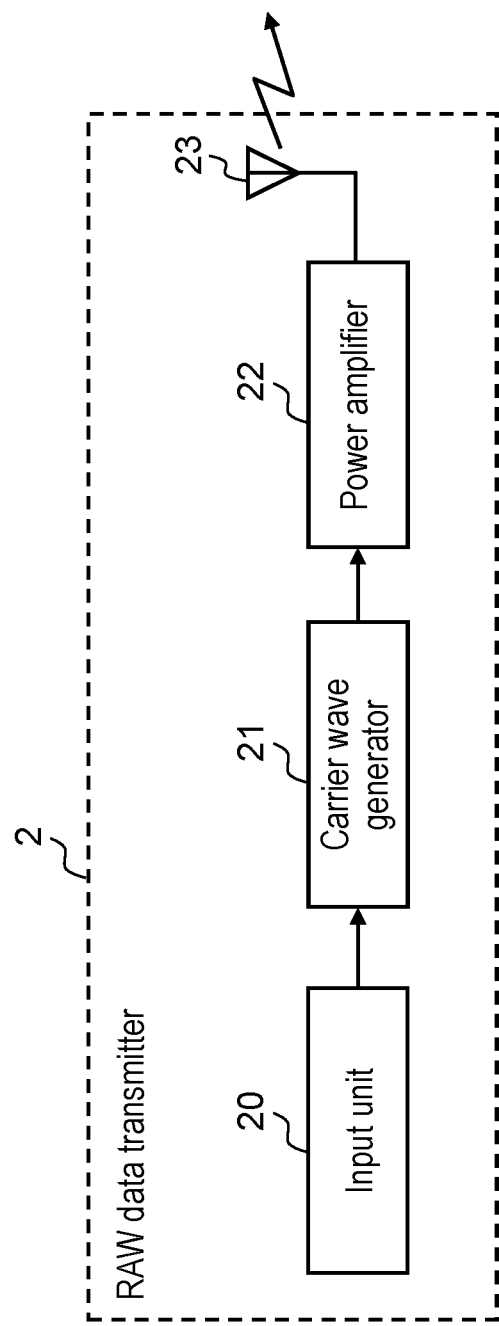
FIG. 3 is a block diagram illustrating a configuration of a raw data transmitter in FIG. 1.

FIG. 3 is a block diagram illustrating a configuration of raw data transmitter 2. Raw data transmitter 2 includes input unit 20, carrier wave generator 21, power amplifier 22, and radio transmitting antenna 23.

Input unit 20 is an input user interface such as a keyboard, a mouse, and a switch, and accepts an operation from the user. When the user performs a transmission start operation, input unit 20 generates a transmission start signal and outputs the transmission start signal to carrier wave generator 21.

Carrier wave generator 21 generates, based on the input transmission start signal, a carrier wave (a radio wave) having a frequency similar to a frequency of a radio wave from the GPS satellite, and outputs the carrier wave to power amplifier 22. Here, carrier wave generator 21 transmits a signal similar to the radio wave from the GPS satellite. That is, carrier wave generator 21 generates a carrier wave of L1 waveband (1575.42 MHz) or L2 waveband (1227.60 MHz) and outputs the carrier wave to power amplifier 22.

Power amplifier 22 is, for example, an power amplifier, and amplifies a voltage level of the input carrier wave to a predetermined voltage level to transmit the carrier wave to positioning terminal 3 via radio transmitting antenna 23.

Figure 4:
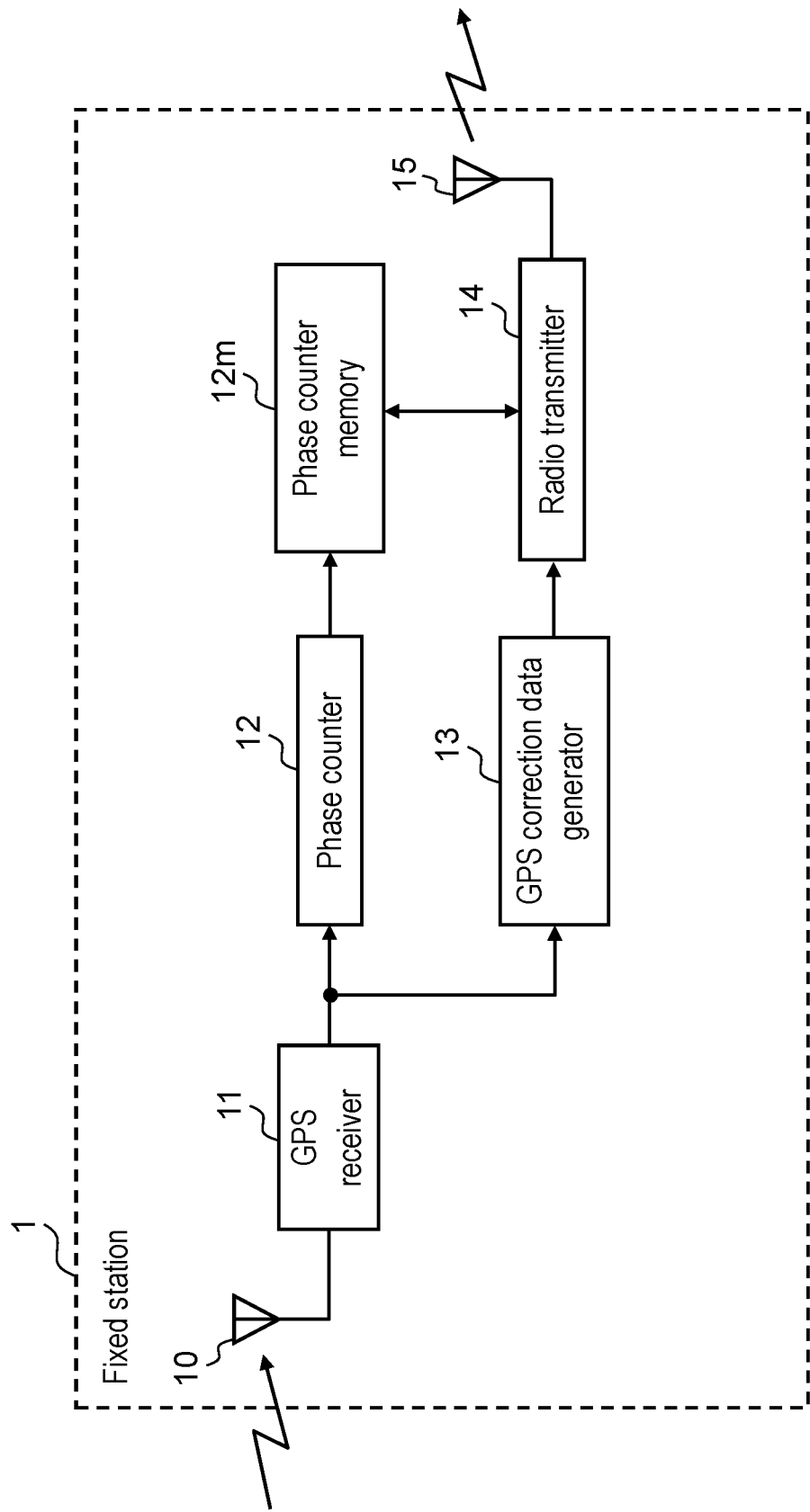
FIG. 4 is a block diagram illustrating a configuration of a fixed station in FIG. 1.

FIG. 4 is a block diagram illustrating a configuration of fixed station 1. Fixed station 1 includes GPS receiving antenna 10, GPS receiver 11, phase counter 12, phase counter memory 12$m$, GPS correction data generator 13, radio transmitter 14, and radio transmitting antenna 15.

GPS receiver 11 receives a radio wave as a carrier wave from the GPS satellite via GPS receiving antenna 10, and outputs received carrier wave data to phase counter 12 and GPS correction data generator 13.

Phase counter 12 counts a wave number of the carrier wave based on the carrier wave data, and calculates a carrier phase to store the carrier phase in phase counter memory 12$m$.

GPS correction data generator 13 generates GPS correction data for calculating position coordinates of positioning terminal 3 by using the RTK positioning method and outputs the GPS correction data to radio transmitter 14.

Radio transmitter 14 transmits the GPS correction data to radio receiving antenna 30-2 of positioning terminal 3 via radio transmitting antenna 15.

2. Operation

An operation of the navigation satellite system having the above configuration will be described below.

Figure 5:
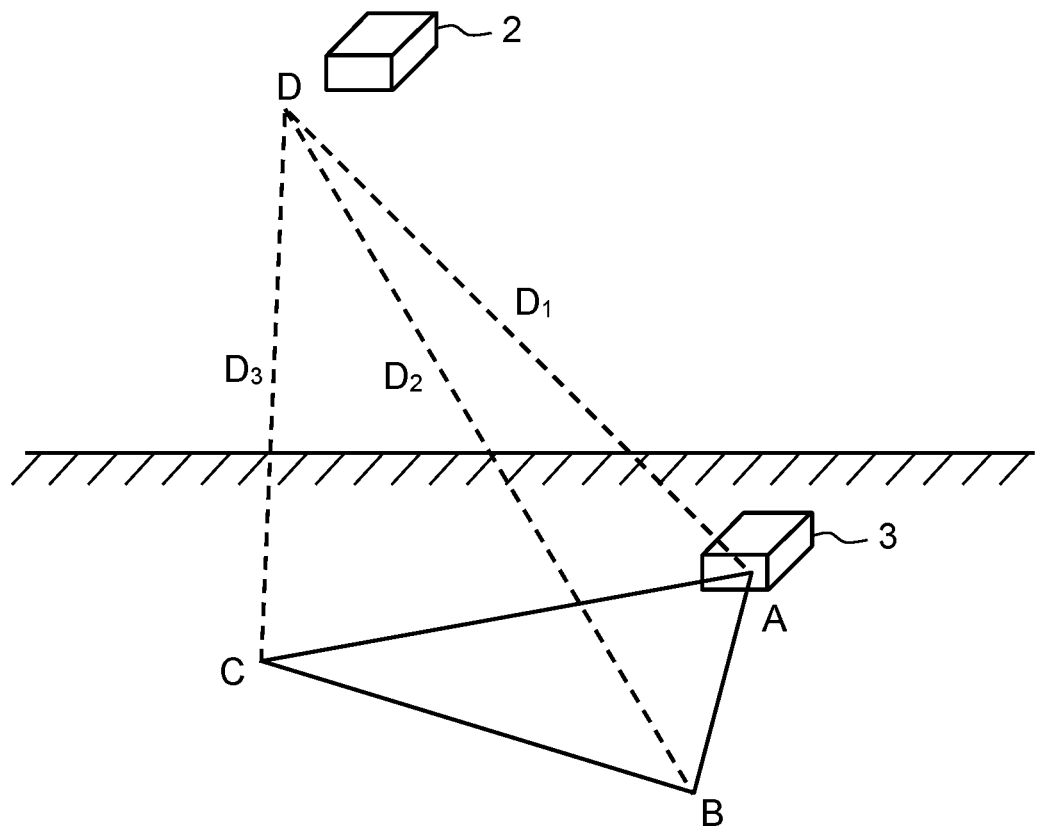
FIG. 5 is a schematic diagram describing an operation of a navigation satellite system according to the exemplary embodiment.

FIG. 5 is a schematic diagram for describing the operation of a navigation satellite system according to the exemplary embodiment. In FIG. 5, points A to C are points where a radio wave from the GPS satellite can be received and point D is a point where a radio wave from the GPS satellite cannot be received. An operation of the navigation satellite system when position coordinates of a position (point D) where a radio wave from the GPS satellite cannot be received is obtained will be described below.

Position coordinates of a first point (point A) is first obtained by using positioning terminal 3 disposed at the first point (point A) where a radio wave from the GPS satellite can be received. Distance D1 from point A to point D is then obtained by using raw data transmitter 2 and positioning terminal 3.

Thereafter, position coordinates of a second point (point B) is obtained by using positioning terminal 3 disposed on the second point (point B) where a radio wave from the GPS satellite can be received. Distance D2 from point B to point D is obtained by using raw data transmitter 2 and positioning terminal 3.

Finally, position coordinates of a third point (point C) is obtained by using positioning terminal 3 disposed at the third point (point C) where a radio wave from the GPS satellite can be received. Distance D3 from point C to point D is then obtained by using raw data transmitter 2 and positioning terminal 3.

Point A to point D are connected by straight lines to form a triangular pyramid. Therefore, when position coordinates of three points (point A to point C) on a bottom face of the triangular pyramid and distances (D1 to D3) from the position coordinates of these three points to an apex (point D) of the triangular pyramid are found, coordinates of the apex (point D) of the triangular pyramid can be obtained by using the following calculating method. This operation will be described in detail below with reference to flowcharts.

FIG. 6A is a flowchart of a process for positioning positioning terminal 3 according to the exemplary embodiment.

In FIG. 6A, the user places positioning terminal 3 on a desired position (point A), and starts positioning of positioning terminal 3 via input unit 37 (step S1). As a result, controller 34 of positioning terminal 3 executes a process for calculating position coordinates (step S2) to calculate and store position coordinates of point A in storage 35. Thereafter, controller 34 of positioning terminal 3 executes a distance calculating process (step S3), and measures distance (D1) between point A and a position (point D) where raw data transmitter 2 is disposed to store the measured distance in storage 35. The position coordinates calculating process (step S2) and the distance calculating process (step S3) will be described in detail below.

Figure 6B:
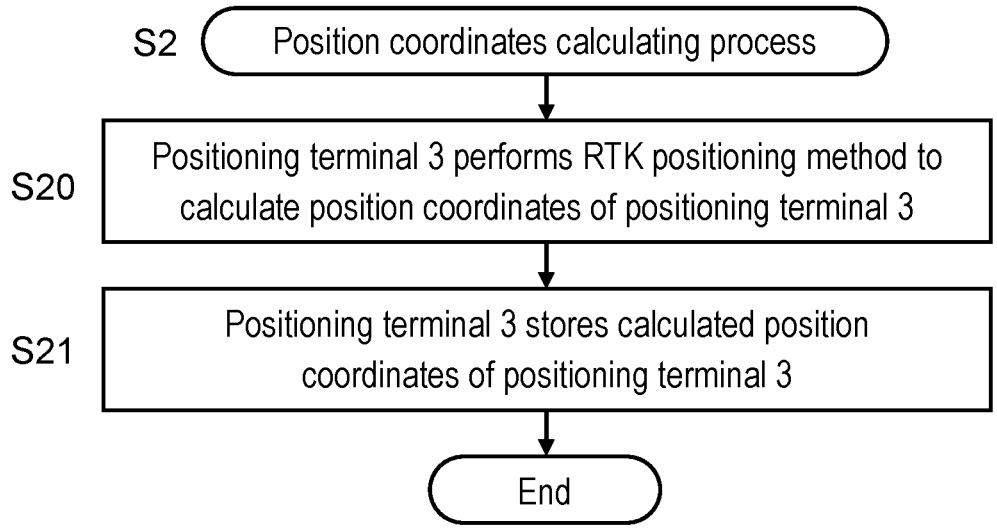
FIG. 6B is a flowchart describing details of a position coordinate calculating process (step S2) in FIG. 6A.

FIG. 6B is a flowchart describing details of the position coordinates calculating process (step S2) in FIG. 6A. In FIG. 6B, controller 34 of positioning terminal 3 executes the RTK positioning method to calculate position coordinates of positioning terminal 3 (step S20), and stores the calculated position coordinates in storage 35 (step S21).

Figure 6C:
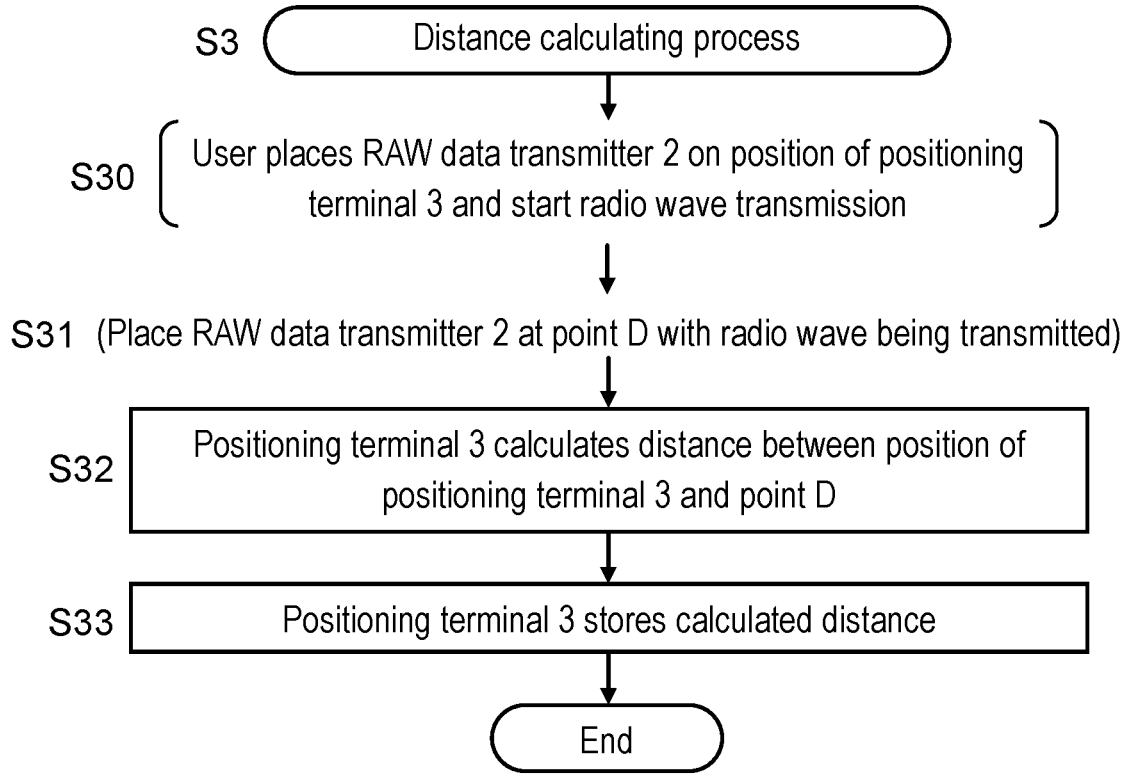
FIG. 6C is a flowchart describing details of a distance calculating process (step S3) in FIG. 6A.

FIG. 6C is a flowchart describing details of the distance calculating process (step S3) in FIG. 6A. In FIG. 6C, the user places raw data transmitter 2 on a position of positioning terminal 3, and starts transmission of a radio wave (step S30). As a result, upon reception of the radio wave from raw data transmitter 2, positioning terminal 3 can set a carrier phase of a radio wave from raw data transmitter 2 to 0. Raw data transmitter 2 is first allowed to approach the position of positioning terminal 3 and to start transmission, and then an initial value of the carrier phase is set. That is, controller 34 of positioning terminal 3 can determine a count starting point of the carrier phase of the radio wave received from raw data transmitter 2. Therefore, at next step S31, when raw data transmitter 2 is placed on point D, positioning terminal 3 can accurately obtain a carrier phase of the radio wave received from raw data transmitter 2.

The user then moves and places raw data transmitter 2 to and at point D (step S31) with the radio wave being transmitted from raw data transmitter 2. With raw data transmitter 2 being placed at point D, controller 34 of positioning terminal 3 counts a carrier phase between the position of positioning terminal 3 and point D in a continuous manner or at certain intervals to calculate distance (D1) between the positioning terminal 3 and point D, based on the radio wave received from raw data transmitter 2 (step S32). Controller 34 of positioning terminal 3 then stores, in storage 35, data about the distance between positioning terminal 3 and point D calculated by positioning terminal 3 (step S33).

For example, when a carrier wave transmitted from raw data transmitter 2 is of L1 waveband (1575.42 MHz) and a count value of the carrier phase is 4.30, a length of one wavelength is 19 cm. Distance (D1) is, therefore, calculated as 19 cm×4.30=81.7 cm. Similarly, when a carrier wave transmitted from raw data transmitter 2 is of L2 waveband (1227.60 MHz) and a count value of the carrier phase is 4.30, a length of one wavelength is 24 cm. Distance (D1) is, therefore, calculated as 24 cm×4.30=103.2 cm.

When a carrier phase is continuously counted, a moving speed of raw data transmitter 2 can be freely set. However, when a carrier phase is counted at certain intervals, the moving speed of raw data transmitter 2 is limited as follows. That is, when a carrier phase is counted at certain intervals, the moving speed of raw data transmitter 2 should be less than one phase of the carrier wave. For example, when the counting is performed at every one second, the counting is performed so as not to shift by a length of one phase, i.e. 19 cm or more at one second. Therefore, when the counting is performed at every one second, raw data transmitter 2 should be moved at a speed slower than 19 cm/sec. When the counting is performed at every 0.1 second, raw data transmitter 2 should be moved at a speed slower than 190 cm/sec. This makes it possible to determine whether the phase shifts by one or two cycles.

In such a manner, position coordinates of point A and distance D1 between point A and point D are obtained. In the similar manner, position coordinates of point B and point C, and a distance between point B or point C and point D are obtained. This process will be described below.

Return to step S4 in the flowchart of FIG. 6A, the user places positioning terminal 3 at a desired position (point B), and starts positioning of positioning terminal 3 via input unit 37 (step S4). As a result, controller 34 of positioning terminal 3 executes the position coordinates calculating process (step S2), and calculates position coordinates of point B to store the position coordinates in storage 35. Controller 34 of positioning terminal 3 then executes the distance calculating process (step S3), and measures distance (D2) between point B and a position (point D) where raw data transmitter 2 is placed to store distance (D2) in storage 35.

The user then places positioning terminal 3 at a desired position (point C), and starts positioning of positioning terminal 3 via input unit 37 (step S5). As a result, controller 34 of positioning terminal 3 executes the position coordinates calculating process (step S2), and calculates position coordinates of point C to store the position coordinates in storage 35. Controller 34 of positioning terminal 3 then executes the distance calculating process (step S3), and measures distance (D3) between point C and a position (point D) where raw data transmitter 2 is placed to store distance (D3) in storage 35.

When the user checks on display unit 36 of positioning terminal 3 that position coordinates of point A to point C, and distances D1 to D3 between point D and point A to point C are calculated, the user executes, via input unit 37, an operation for instructing calculation of position coordinates of point D (step S6). As a result, controller 34 of positioning terminal 3 calculates, based on the position coordinate data of points A to C, and the distances (D1 to D3) data, position coordinates of apex D of triangular pyramid ABCD, and displays the calculated position coordinates of point D on display unit 36 to end the process.

The position coordinates of apex D of triangular pyramid ABCD can be calculated in accordance with simultaneous equation (1) of an equation for the distance between point A and point D, an equation for the distance between point B and point D, and an equation for the distance between point C and point D.

Position coordinates (x1, y1, z1), (x2, y2, z2), (z3, z3, z3) of point A to point C are calculated in the above manner. Distance D1 between point A and point D, distance D2 between point B and point D, and distance D3 between point C and point D are calculated as described above. Therefore, position coordinates (X, Y, Z) of point D can be obtained by assigning a known value to simultaneous equation (1) below.

[Equation 1]

$$D1 = \sqrt{(X-x1)^2+(Y-y1)^2+(Z-z1)^2}$$

$$D2 = \sqrt{(X-x2)^2+(Y-y2)^2+(Z-z2)^2}$$

$$D3 = \sqrt{(X-x3)^2+(Y-y3)^2+(Z-z3)^2} \quad (1)$$

The operation of the navigation satellite system has been described above as to the case where the position coordinates of raw data transmitter 2 are calculated based on the position coordinates of the three points, and the distances between each one of the three points and raw data transmitter 2. An operation of the navigation satellite system will be described below as to a case where position coordinates of raw data transmitter 2 are calculated based on position coordinates of points n (n: a natural number of 3 or above), and respective distances between the points n and raw data transmitter 2.

GPS radio wave receiver 31 of positioning terminal 3 receives first radio waves from raw data transmitter 2 and second radio waves from the GPS satellite at points n.

Controller 34 of positioning terminal 3 then calculates distances between positioning terminal 3 and raw data transmitter 2 at points n, based on the received first radio waves. Further, controller 34 calculates position coordinates of positioning terminal 3 at points n based on the received second radio waves.

Controller 34 then calculates position coordinates of raw data transmitter 2 based on calculated n sets of position coordinates and n distances between the n sets of position coordinates and raw data transmitter 2. Position coordinates (X, Y, Z) of raw data transmitter 2 can be obtained from, for example, the calculated n sets of position coordinates and the n distances between the n sets of position coordinates and raw data transmitter 2 in accordance with a least square method. Specifically, controller 34 solves simultaneous equation (2) described below to calculate position coordinates (X, Y, Z) of raw data transmitter 2.

[Equation 2]

$$\frac{\partial s}{\partial X} \quad \frac{\partial s}{\partial Y} \quad \frac{\partial s}{\partial Z} \quad (2)$$

In this equation, s is expressed by equation (3) described below. $(x_i, y_i, z_i)$ represents the calculated n sets of position coordinates (i=natural number from 1 to n), $D_i$ represents n distances between n positioning terminals 3 and raw data transmitter 2 (i=natural number from 1 to n).

[Equation 3]

$$s = \Sigma_{i=1}^{n} \{\sqrt{(X-x_i)^2 + (Y-y_i)^2 + (Z-z_i)^2} - D_i\}^2 \quad (3)$$

Some or all of the calculations to be performed by controller 34 described above can be performed also outside positioning terminal 3. For example, n sets of position coordinates $(x_i, y_i, z_i)$ and n distances $D_i$ between n positioning terminals 3 and raw data transmitter 2 are transmitted to a device other than positioning terminal 3, and are calculated by the device other than positioning terminal 3. As a result, position coordinates (X, Y, Z) of raw data transmitter 2 can be obtained.

3. Effects and Others

The navigation satellite system according to the present exemplary embodiment includes raw data transmitter 2 that transmits a first radio wave having a predetermined frequency, and positioning terminal 3 that calculates position coordinates of positioning terminal 3 by using a second radio wave from the GPS satellite. The navigation satellite system obtains position coordinates of raw data transmitter 2. Positioning terminal 3 includes GPS radio wave receiver 31 and controller 34. GPS radio wave receiver 31 receives the first radio wave from raw data transmitter 2 and the second radio wave from the GPS satellite. Controller 34 calculates the distance between positioning terminal 3 and raw data transmitter 2 based on the received first radio wave, and calculates position coordinates of the positioning terminal 3 based on the received second radio wave. Controller 34 calculates position coordinates of three or more points based on the received second radio wave received when positioning terminal 3 is present at the three or more points, and calculates distances between positioning terminal 3 and raw data transmitter 2 when positioning terminal 3 is present at the three or more points. Controller 34 then calculates position coordinates of raw data transmitter 2 based on the position coordinates of three or more points and the distances between each one of the three or more points and raw data transmitter 2.

This configuration makes it possible to obtain position coordinates of a position where a radio wave from the GPS satellite cannot be received more accurately.

Further, in the navigation satellite system according to the present exemplary embodiment, controller 34 calculates coordinates of a first point based on the second radio wave received when positioning terminal 3 is present at the first point. Controller 34 calculates coordinates of a second point based on the second radio wave received when positioning terminal 3 is present at the second point. Controller 34 calculates coordinates of a third point based on the second radio wave received when positioning terminal 3 is present at the third point. Controller 34 calculates a first distance between positioning terminal 3 and raw data transmitter 2 when positioning terminal 3 is present at the first point, and calculates a second distance between positioning terminal 3 and raw data transmitter 2 when positioning terminal 3 is present at the second point. Controller 34 further calculates a third distance between positioning terminal 3 and raw data transmitter 2 when positioning terminal 3 is present at the third point. Controller 34 calculates position coordinates of raw data transmitter 2 based on the calculated coordinates of the first to third points and first to third distances.

This configuration makes it possible to accurately obtain coordinates of the three points (point A to point C) on the bottom face of the triangular pyramid through the RTK positioning method. Further, the distances (D1 to D3) from the three points on the bottom face of the triangular pyramid to the apex (point D) of the triangular pyramid can be accurately obtained based on a wave number of a carrier wave. Therefore, the position coordinates of the position (point D) where a radio wave from the GPS satellite cannot be received can be obtained more accurately.

Further, in the navigation satellite system according to the present exemplary embodiment, raw data transmitter 2 transmits a first radio wave having a frequency of 1575.42 MHz or 1227.60 MHz.

With this configuration, in positioning terminal 3, a radio wave from the GPS satellite and a radio wave from raw data transmitter 2 have the same frequency. Therefore, the receiver (GPS radio wave receiver 31 and phase counter 32) that receives a radio wave from the GPS satellite can be used also as the receiver (GPS radio wave receiver 31 and phase counter 32) that receives a radio wave from raw data transmitter 2, or vice versa. Therefore, a circuit that receives a radio wave from raw data transmitter 2 does not have to be added. Therefore, an increase in a circuit scale can be suppressed.

The positioning method for the navigation satellite system according to the present exemplary embodiment is a method for calculating position coordinates of a desired position by using raw data transmitter 2 that transmits a first radio wave having a predetermined frequency and positioning terminal 3 that calculates position coordinates of positioning terminal 3 by using a second radio wave from the GPS satellite. The positioning method includes a step of, when positioning terminal 3 is present at the three or more points, causing raw data transmitter 2 to transmit a first radio wave on the desired position. Further, the positioning method includes a step of receiving, when positioning terminal 3 is present at the three or more points, the first radio wave from raw data transmitter 2, and the second radio wave from the GPS satellite. Further, the positioning method includes a step of, based on the second radio wave received when positioning terminal 3 is present at the three or more points, calculating position coordinates of the three or more points. Further, the positioning method includes a step of, based on the first radio wave received when positioning terminal 3 is present at the three or more points, distances between positioning terminal 3 and raw data transmitter 2. Further, the positioning method includes a step of calculating position coordinates of the desired position based on the respective position coordinates of positioning terminal 3 and distances between positioning terminal 3 and raw data transmitter 2 when positioning terminal 3 is present at three or more points.

This method makes it possible to obtain position coordinates of a position where a radio wave from the GPS satellite cannot be received more accurately.

Positioning terminal 3 according to the present exemplary embodiment calculates position coordinates of positioning terminal 3 by using a radio wave from the GPS satellite. Positioning terminal 3 includes GPS radio wave receiver 31 and controller 34. GPS radio wave receiver 31 receives a first radio wave from raw data transmitter 2 on a desired position and a second radio wave from the GPS satellite. Controller 34 calculates the distance between positioning terminal 3 and raw data transmitter 2 based on the received first radio wave, and calculates position coordinates of the positioning terminal 3 based on the received second radio wave. Controller 34 calculates, based on a second radio wave received when positioning terminal 3 is present at a plurality of points, respective position coordinates of the plurality of points, and respective distances between positioning terminal 3 and raw data transmitter 2 when positioning terminal 3 is present at the plurality of points. Controller 34 then calculates position coordinates of raw data transmitter 2 based on position coordinates of three or more points, and respective distances between each one of the three or more points and raw data transmitter 2.

This configuration makes it possible to obtain position coordinates of a position where a radio wave from the GPS satellite cannot be received more accurately.

Other Exemplary Embodiments

The exemplary embodiment has been described above as examples of the technique disclosed in the present application. However, the technique of the present disclosure is not limited to the exemplary embodiment, and is applicable also to another exemplary embodiment in which a change, a replacement, an addition, or an omission is appropriately made. A new exemplary embodiment can also be made by a combination of the components described in the above exemplary embodiment.

In the above exemplary embodiment, components that configure fixed station 1, raw data transmitter 2, and positioning terminal 3 may be configured as one module, or combinations of the components may configure a plurality of modules. Further, the GPS receiving antenna and the radio transmitting/receiving antennas may be installed outside fixed station 1, raw data transmitter 2, and positioning terminal 3 as external antennas, or installed inside fixed station 1, raw data transmitter 2, and positioning terminal 3 as built-in antennas.

Further, in the above exemplary embodiment, one positioning terminal 3 is moved to each apex of a bottom face of a triangular pyramid, and thus coordinates of each apex on the bottom face of the triangular pyramid, and each distance between each apex on the bottom face of the triangular pyramid and an apex of the triangular pyramid (the position of raw data transmitter 2) has been obtained, but the present disclosure is not limited to this configuration. For example, positioning terminals 3 may be disposed on apexes of the bottom face of the triangular pyramid respectively, and positioning terminals 3 may obtain position coordinates of positioning terminals 3 and respective distances between positioning terminals 3 and the apex of the triangular pyramid. In this case, any one of positioning terminals 3 is set as a first electronic device that calculates coordinates of the apex of the triangular pyramid. The first electronic device has a function for receiving data obtained in the other electronic devices, i.e. the second and third electronic devices. The second and third electronic devices have a function for transmitting the data obtained in these devices to the first electronic device.

Further, in the above exemplary embodiment, fixed station 1 has been described as a fixed station (a real reference station: RRS) installed at a known point, but the fixed station is not limited to this. For example, a virtual reference station (VRS) may be used.

Further, in the above exemplary embodiment, a personal computer is exemplified as the electronic devices, but the present disclosure is not limited to this configuration. For example, the present disclosure is widely applicable to electronic devices such as tablet terminals, mobile phones, and smart phones.

Furthermore, in the above exemplary embodiment, positioning terminals 3 at three points receive radio waves from GPS satellite, respectively, and calculate position coordinates of an unknown point based on position coordinates at the respective points. However, the present disclosure is not limited to this, and positioning terminals 3 at four or more points receive radio waves form the GPS satellite respectively, and may calculate position coordinates of an unknown point based on position coordinates of the respective points and respective distances between the points and the unknown point. Further, positioning terminal 3 may select three points optimum for calculating the unknown point from the position coordinates of the four or more points to calculate position coordinates of the unknown point based on the position coordinates of the selected three points, and respective distances between each one of the three points and the unknown point. The optimum three points may be three points that can form the triangular pyramid together with the unknown point.

The exemplary embodiment has been described above and exemplified as the technique of the present disclosure. The accompanying drawings and detailed description have been provided for this purpose.

Accordingly, the components described in the appended drawings and the detailed description include not only components essential for solving the above problem, but also components that are not essential. Therefore, it should not be immediately construed that these components that are not essential are essential even if the components are described in the appended drawings and the detailed description.

Since the above described exemplary embodiment is for exemplifying the technique of the present disclosure, various modifications, replacements, additions, and omissions can be made within the scope of the appended claims or of their equivalents.

The present disclosure is applicable to any electronic device that has a function for calculating position coordinates through the RTK positioning method using a radio wave from a GNSS satellite such as a GPS satellite. Further, the present disclosure is also applicable to an electronic device having a function for calculating position coordinates through the positioning method using a carrier wave. Specifically, the present disclosure is applicable to tablet terminals, mobile phones, smart phones, and the like. Further, the present disclosure is also applicable to a navigation satellite system and a positioning method having such electronic devices.

What is claimed is:

1. A navigation satellite system comprising:
a transmitter that transmits a first radio wave; and
an electronic device that calculates position coordinates of the electronic device by using a second radio wave from a global navigation satellite system (GNSS) satellite, the navigation satellite system obtaining position coordinates of the transmitter, wherein both the first radio wave and the second radio wave have a same predetermined frequency,
wherein the electronic device includes:
a receiver that receives the first radio wave from the transmitter and the second radio wave from the GNSS satellite, and
a controller that calculates a distance between the electronic device and the transmitter based on the received first radio wave, and calculates position coordinates of the electronic device based on the received second radio wave, and
wherein the controller:
calculates, based on the second radio wave received when the electronic device is present at each one of three or more points, respective position coordinates of the three or more points,
calculates respective distances between the electronic device and the transmitter when the electronic device is present at each one of the three or more points, and
calculates position coordinates of the transmitter based on the position coordinates of at least three points, which are included in the three or more points and respective distances between each one of the at least three points and the transmitter.

2. The navigation satellite system according to claim 1, wherein:
the at least three points comprise only three points; and
the controller
calculates, based on the second radio wave received when the electronic device is present at a first point, coordinates of the first point,
calculates, based on the second radio wave received when the electronic device is present at a second point, coordinates of the second point,
calculates, based on the second radio wave received when the electronic device is present at a third point, coordinates of the third point,
calculates a first distance between the electronic device and the transmitter when the electronic device is present at the first point,
calculates a second distance between the electronic device and the transmitter when the electronic device is present at the second point,
calculates a third distance between the electronic device and the transmitter when the electronic device is present at the third point, and
calculates position coordinates of the transmitter based on the calculated coordinates of the first point, the second point, and the third point and the first distance, the second distance, and the third distance.

3. The navigation satellite system according to claim 1, wherein the predetermined frequency is 1575.42 MHz or 1227.60 MHz.

4. The navigation satellite system according to claim 1, wherein
the at least three points include all points of the three or more points.

5. The navigation satellite system according to claim 1, wherein
the three or more points include four or more points, and
the at least three points are selected from the four or more points.

6. A positioning method for a navigation satellite system for calculating position coordinates of a desired position by using a transmitter that transmits a first radio wave and an electronic device that calculates position coordinates of the electronic device by using a second radio wave from a global navigation satellite system (GNSS) satellite, both the first radio wave and the second radio wave having a same predetermined frequency, the positioning method comprising:
when the electronic device is present at each one of three or more points, causing the transmitter to transmit the first radio wave;
causing the electronic device to receive the first radio wave from the transmitter and the second radio wave from the GNSS satellite when the electronic device is present at each one of the three or more points;
calculating, based on the second radio wave received when the electronic device is present at each one of the three or more points, respective position coordinates of the three or more points;
calculating, based on the first radio wave received when the electronic device is present at each one of at least three points which are included in the three or more points, respective distances between the electronic device and the transmitter; and
calculating, based on the respective position coordinates and distances between the electronic device and the transmitter when the electronic device is present at each one of the at least three points, the position coordinates of the desired position.

7. The positioning method for a navigation satellite system according to claim 6, wherein the distance between the electronic device and the transmitter is calculated based on a wave number of the first radio wave received from the transmitter.

8. The positioning method for a navigation satellite system according to claim 6, wherein the predetermined frequency is 1575.42 MHz or 1227.60 MHz.

9. The navigation satellite system according to claim 6, wherein
the at least three points include all points of the three or more points.

10. The navigation satellite system according to claim 6, wherein
the three or more points include four or more points, and the at least three points are selected from the four or more points.

11. An electronic device that calculates position coordinates of the electronic device by using a radio wave from a global navigation satellite system (GNSS) satellite, the electronic device comprising:
a receiver that receives a first radio wave from a transmitter on a desired position and a second radio wave from the GNSS satellite; and
a controller that calculates a distance between the electronic device and the transmitter based on the received first radio wave, and calculates position coordinates of the electronic device based on the received second radio wave,
wherein both the first radio wave and the second radio wave have a same predetermined frequency; and
wherein the controller:
calculates, based on the second radio wave received when the electronic device is present at each one of three or more points, position coordinates of the three or more points,
calculates respective distances between the electronic device and the transmitter when the electronic device is present at each one of the three or more points, and
calculates position coordinates of the transmitter based on the respective position coordinates of at least three points which are included in the three or more points and distances between each one of the at least three points and the transmitter.

12. The electronic device according to claim 11, wherein:
the at least three points comprise only three points; and
the controller
calculates, based on the second radio wave received when the electronic device is present at a first point, coordinates of the first point,
calculates, based on the second radio wave received when the electronic device is present at a second point, coordinates of the second point,
calculates, based on the second radio wave received when the electronic device is present at a third point, coordinates of the third point,
calculates a first distance between the electronic device and the transmitter when the electronic device is present at the first point,
calculates a second distance between the electronic device and the transmitter when the electronic device is present at the second point,
calculates a third distance between the electronic device and the transmitter when the electronic device is present at the third point, and
calculates position coordinates of the transmitter based on the calculated coordinates of the first point, the second point, and the third point and the first distance, the second distance, and the third distance.

13. The electronic device according to claim 11, wherein the predetermined frequency is 1575.42 MHz or 1227.60 MHz.

14. The navigation satellite system according to claim 11, wherein
the at least three points include all points of the three or more points.

15. The navigation satellite system according to claim 11, wherein
the three or more points include four or more points, and
the at least three points are selected from the four or more points.

16. A transmitter for a navigation satellite system, the navigation satellite system including a transmitter that transmits a first radio wave and an electronic device that calculates position coordinates of the electronic device by using a second radio wave from a global navigation satellite system (GNSS) satellite, the navigation satellite system obtaining position coordinates of the transmitter, wherein both the first radio wave and the second radio wave have a same predetermined frequency the predetermined frequency is 1575.42 MHz or 1227.60 MHz.

* * * * *